Figure 1:
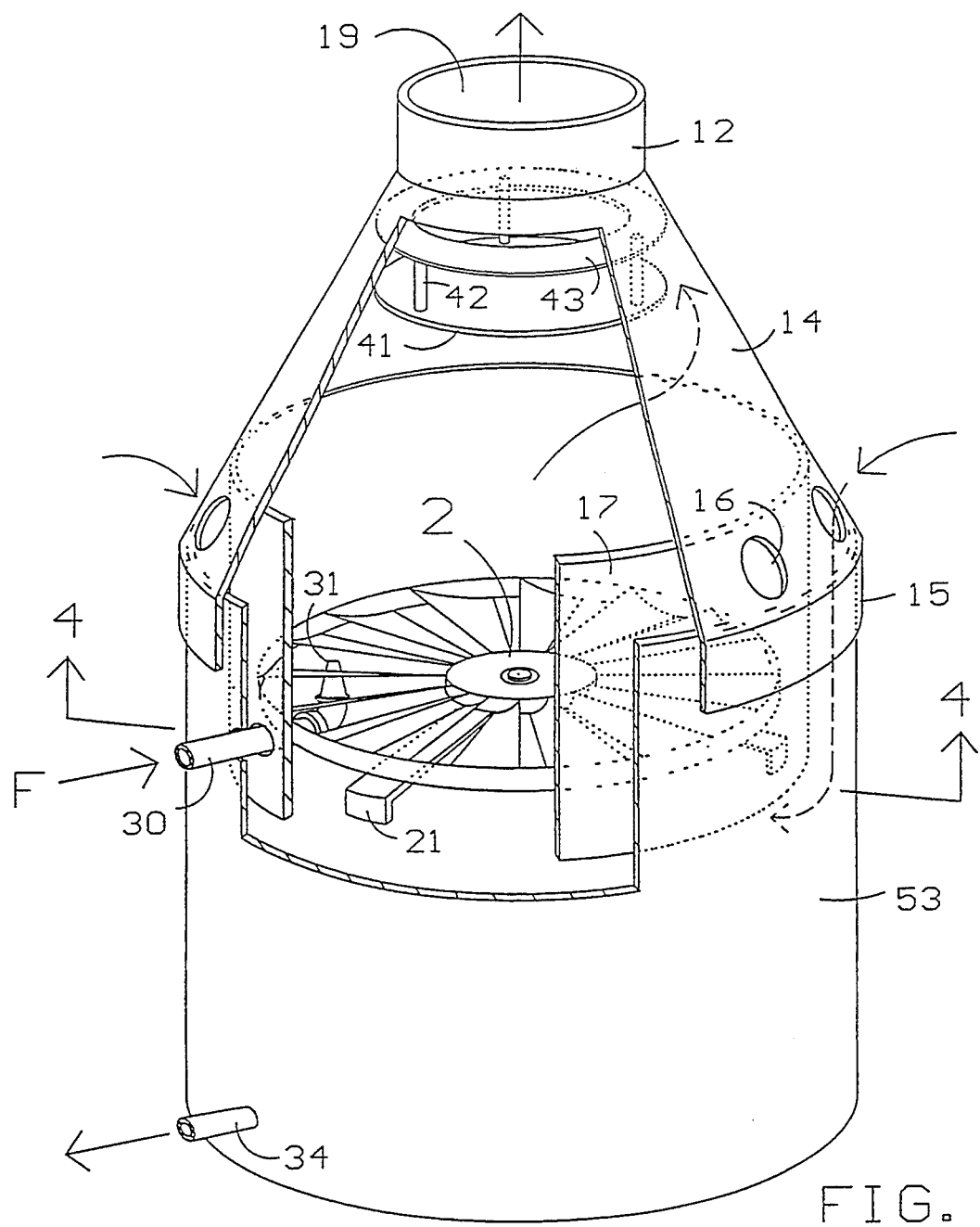
Figure 2:
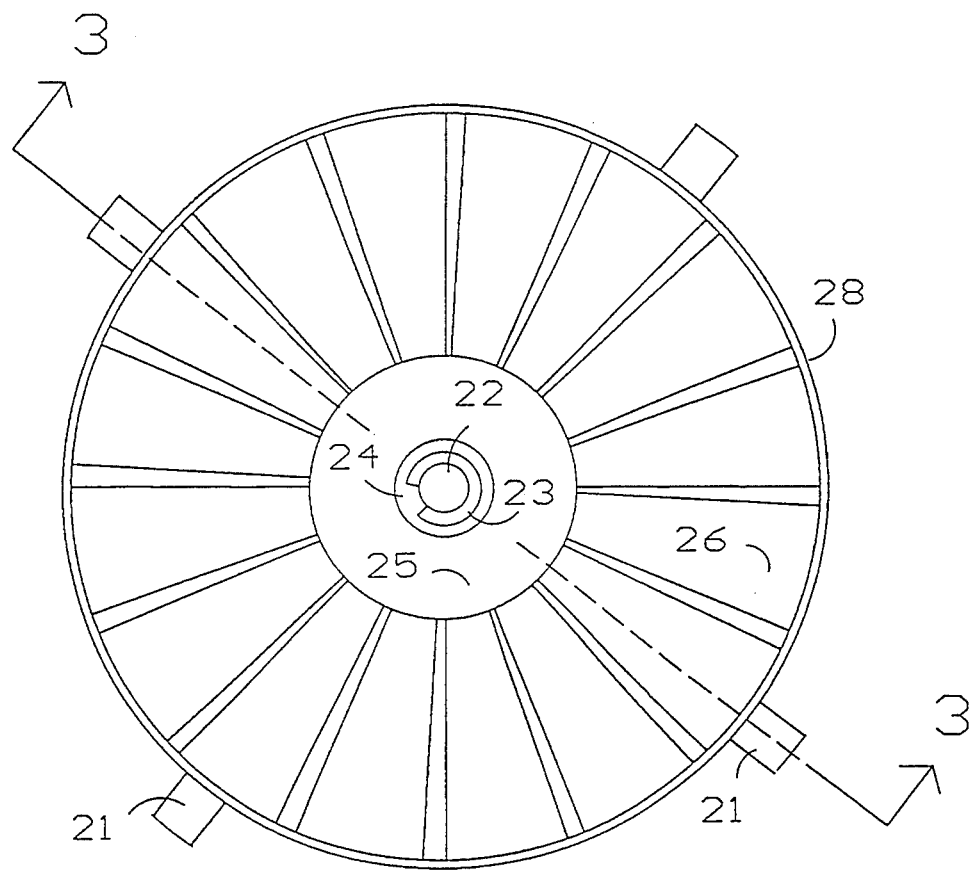
Figure 3:
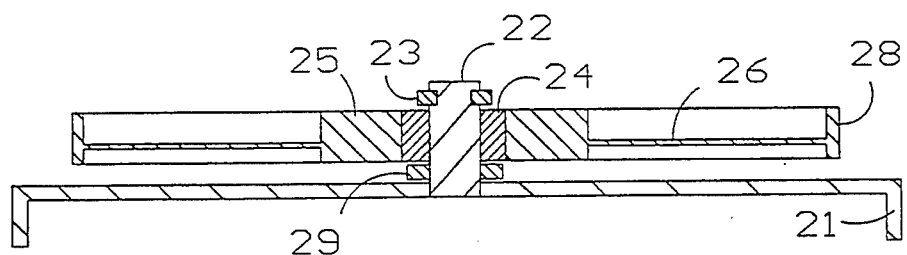
Figure 4:
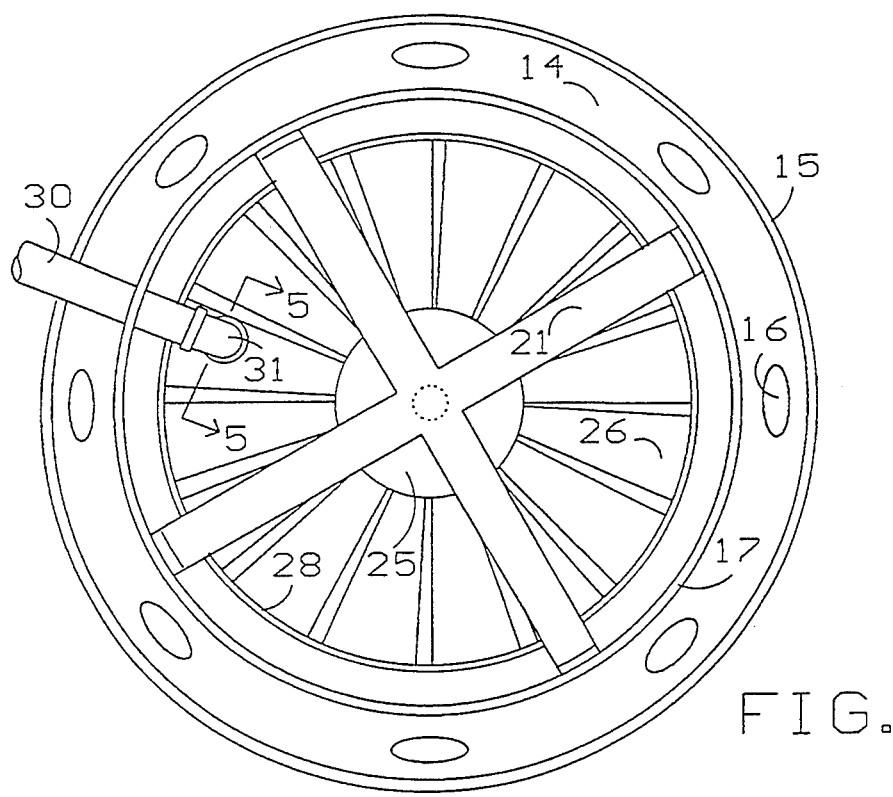
Figure 5:
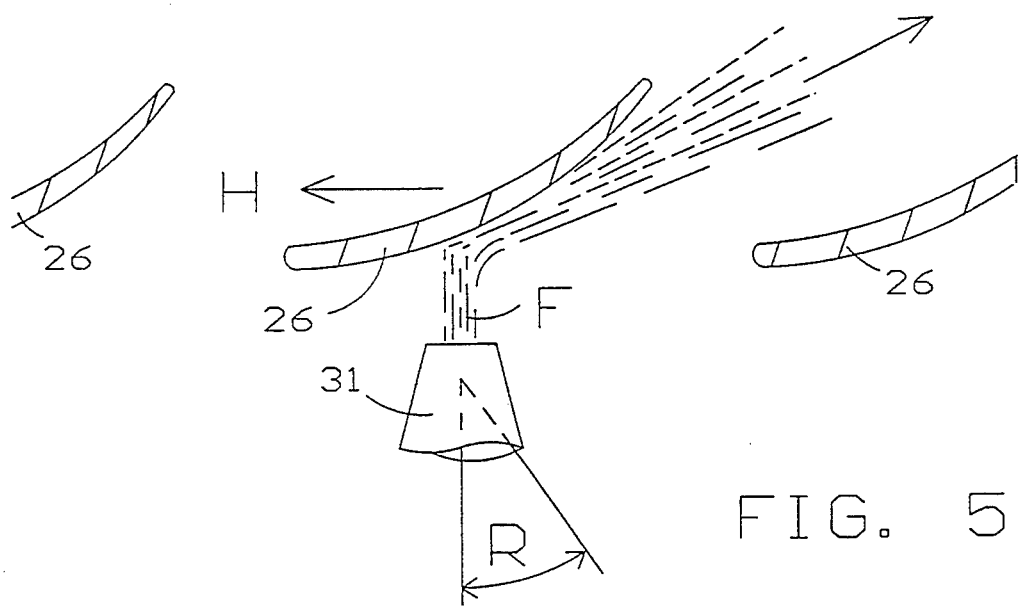
Figure 6:
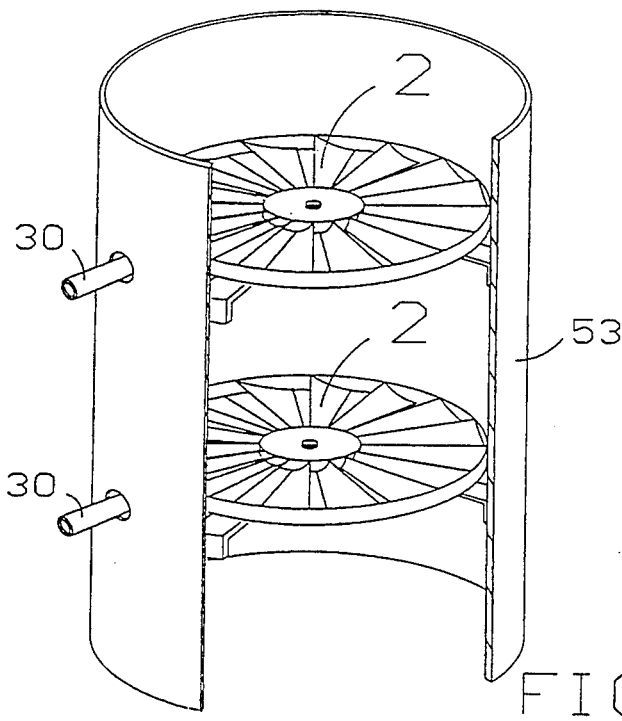
Figure 7:
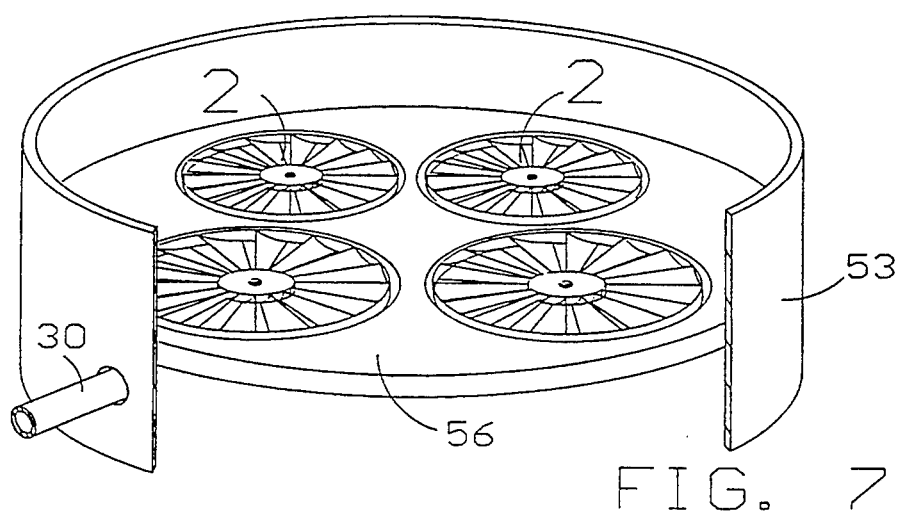

United States Patent [19]

Trapasso

[11] Patent Number: 5,439,618
[45] Date of Patent: Aug. 8, 1995

[54] TURBINE WATER ATOMIZER

[76] Inventor: Michael A. Trapasso, 3580 1st Ave. SW., Naples, Fla. 33964

[21] Appl. No.: 288,183

[22] Filed: Aug. 9, 1994

[51] Int. Cl.⁶ .................................................. B01F 3/04
[52] U.S. Cl. .......................................... 261/25; 261/89
[58] Field of Search .................................. 261/25, 89

[56] References Cited

U.S. PATENT DOCUMENTS

| | | | |
|---|---|---|---|
| 621,718 | 3/1899 | Seymour | 261/25 |
| 677,235 | 6/1901 | Kennedy | 261/89 |
| 679,761 | 8/1901 | Lion | 261/89 |
| 797,661 | 8/1905 | Cline | 261/108 |
| 976,246 | 11/1910 | Alberger | 261/25 |
| 1,462,063 | 7/1923 | Hyne | 261/108 |
| 1,832,701 | 11/1931 | Grahm | 261/25 |
| 1,866,443 | 7/1932 | Zumbro | 261/108 |
| 2,672,328 | 3/1954 | Mart | 261/25 |
| 2,811,258 | 10/1957 | Schleyer et al. | 261/89 |
| 3,141,909 | 7/1964 | Mayo | 261/25 |
| 3,265,370 | 8/1966 | Scholten | 261/3 |
| 3,336,733 | 8/1967 | Wisting | 261/89 |
| 3,478,496 | 11/1969 | Keongh | 261/89 |
| 3,518,816 | 7/1970 | Jalma | 55/240 |
| 3,693,326 | 9/1972 | Deane | 261/25 |
| 4,092,379 | 5/1978 | Saxton | 261/25 |
| 4,198,360 | 4/1980 | Shafranovsky et al. | 261/25 |
| 5,015,370 | 5/1991 | Fricano | 210/138 |

FOREIGN PATENT DOCUMENTS 1493  6/1990  Germany ................ 261/25

Primary Examiner—Tim R. Miles

[57] ABSTRACT

A water atomization system for cooling, aeration, and pollution control gas scrubbing, wherein a multiple blade fan is mounted in a tower cap, or positioned directly inside of a tank or tower. Water exiting nozzles impinges off the fan blades, thereby propelling and rotating the fan. The rotating fan atomizes the water into fine droplets, and forces air through the atomized water. For cooling and aeration applications, heat or dissolved gasses in the water are liberated and carried away by the flowing air. The system can also be used for pollution control, whereby instead of air traveling through the device, gasses of combustion flow through it. The water traps, absorbs, and chemically reacts with suspended particles in the flowing gasses.

5 Claims, 4 Drawing Sheets

TURBINE WATER ATOMIZER

BACKGROUND—FIELD OF INVENTION

This invention is a high efficiency water atomizer relating generally to the following three processes that use water droplets and air or gas flow:
1. Aeration of well water to remove unwanted gasses.
2. Water cooling towers for heat removal.
3. Pollution control gas scrubbing to remove solids and chemicals.

BACKGROUND—DISCUSSION OF PRIOR ART

The removal of both gasses and heat from water use the same basic principal of air flowing past water droplets. The three main factors that affect these processes are:
1. The surface area of the water exposed to the air. The smaller the water droplets, the greater the surface area to volume ratio of the droplet. As this ratio increases, more gas or heat can transfer from the water to the air in a given time period.
2. The amount of time that the water is suspended in the air. As suspension time increases, more time is available for gas or heat to transfer out of the water.
3. Air flowing past the droplets. Fresh or cool air flowing past the droplets carries away the gas or heat that transfers out of the water.

Similarly, the scrubbing and removal of chemicals and particles from gasses of combustion use the same principals. The difference being that the water is reacting with, absorbing, and collecting chemicals and particles from the flowing gasses, as opposed to liberating gas or heat from the water to the air.

The above principals are usually demonstrated by using a spray or drip mechanism inside a tower, and by mechanically forcing air or gasses past the suspended or falling droplets. Following are three prior art examples of cooling, aeration and scrubbing systems that each use all three of the above principals:
1. The water cooling tower of U.S. Pat. No. 4,092,379 to Saxton, 1978 May 30.
2. The aeration apparatus of U.S. Pat. No. 3,265,370 to Scholten, 1966 Aug. 9.
3. The pollution control gas scrubber of U.S. Pat. No. 3,693,326 to Deane, 1972 Sept. 26.

All three of these prior art examples are very complicated, have many parts, are costly to construct, and require varying degrees of routine maintenance.

OBJECTS OF THE INVENTION

It is an object of this invention to provide an effective, highly efficient, atomization system that can be used for water cooling, water aeration, and pollution control gas scrubbing.

More specifically, it is an object of this invention to provide a system that is relatively inexpensive to construct, install, operate, maintain, and adapt to existing structures.

The foregoing objects and other objects and advantages of this invention will become apparent from a consideration of the drawings and ensuing description.

DESCRIPTION OF DRAWINGS

FIG. 1 is a perspective view of a tower cap showing a typical form of equipment embodying the present invention. A portion of the tower, and the outer cone and inner fan shroud are cut away.

FIG. 2 is a top view of the fan and mounting bracket assembly.

FIG. 3 is a horizontal section view taken along line 3—3 of FIG. 2.

FIG. 4 is a bottom view of the tower cap taken along line 4—4 of FIG. 1.

FIG. 5 is a horizontal section view taken along line 5—5 of FIG. 4 showing the action of the water jet striking a fan blade.

FIG. 6 is a broken away perspective view of an alternate form of the invention.

FIG. 7 is a broken away perspective view of another alternate form of the invention.

DESCRIPTION OF INVENTION

In that form of the invention chosen for purposes of illustration in FIG. 1 of the drawing, the equipment embodies a conical chamber 14 having an outlet at the top 19 through a cylindrical section 12, and a cylindrical skirt 15 at the bottom. The chamber 14 sits on top of an existing tank or tower 53 and is supported at the cones intersection with the top edge of the tower. A cylindrical skirt 15 attached to the bottom edge of chamber 14 holds the chamber from sliding off the tower. A cylindrical fan shroud 17 of a smaller diameter than the tower 53 is attached and sealed water tight along its top edge to the sloping inner wall of the chamber 14. The inner wall of the fan shroud has attached to it the horizontal fan support brackets 21 of the fan assembly 2 as shown in FIG. 2.

The fan assembly in FIG. 2 shows the fan hub 25 with attached blades 26 and outer support ring 28, free to rotate on bearing 24 about a fixed vertical shaft 22. The shaft is attached to the center of the cross brace 21 and projects upward. The bearing 24 rests on thrust washer 29 of FIG. 3 and is mounted on fixed shaft 22. A retaining clip 23 holds the bearing 24 and fan hub 25 on the shaft. Attached to the fan hub 25 are pitched radial blades 26 with an outer support ring 28. A cross section of FIG. 2 taken along line 3—3 is shown in FIG. 3.

Referring to FIG. 1, a feed water supply pipe 30 extends through the side of tank 53 and passes through fan shroud 17. On the end of the supply pipe is a nozzle 31 pointed in a vertical direction at the fan blades 26 and below the fan assembly 2. A deflector ring 43, is attached and sealed water tight to the inside of the sloping wall of the chamber 14. Supports 42 extending from the bottom of the deflector ring 43 support a deflector plate 41.

Optional fresh air inlet vents 16 are located around the perimeter of the sloping conical sides of the chamber 14 between the fan shroud attach point and the bottom skirt 15.

The bottom view of the tower cap FIG. 4, is a cross section of FIG.1 taken along line 4—4. The tower 53 has been omitted for clarity. Line 5—5 is shown through the nozzle and blades of FIG. 4, as depicted in FIG.5.

OPERATION OF INVENTION

Referring to FIG.5, incoming feed water F is shown exiting the tip of the nozzle 31 at high velocity and deflecting off the bottom of fan blade 26 into the chamber above the fan assembly 2. A horizontal component of force is imparted against the fan blade 26 in the direction of the arrow H due to the change in momentum of the deflecting feed water. This force causes the fan blade 26 to move in the direction of arrow H, thereby rotating the fan. As successive fan blades 26 pass through feed water exiting the nozzle 31, the fan accelerates until an equilibrium of forces is reached and then maintains a constant rotational velocity. The nozzle 31 can be mounted with its centerline at a set angle R relative to the fan blades, to optimize the speed and efficiency of the fan.

The water deflecting into the chamber above the fan assembly 2 deflects off the walls of the fan shroud 17 and conical chamber walls 14, and falls into the rotating fan blades 26. This action causes the water to break up into fine droplets and deflects the droplets back up into the chamber. Water droplets flying around inside the chamber are prevented from exiting through the outlet 19 by deflecting off the bottom of the deflector plate 41 or off the deflector ring 43 back into the fan. The rotating fan blades 26 force air or gasses from below the fan assembly 2 through the atomized water droplets in the chamber 14, and out the exhaust outlet 19 at the top of the chamber. Fresh air may be vented to the bottom side of the fan assembly through optional air inlet vents 16.

Atomized water droplets eventually fall through the annular gap between the fan blade support ring 28 and the inside of the fan shroud 17, or directly through the spaces between the fan blades 26, into the tower below. Processed water exits the tower through outlet pipe 34.

An alternate fan arrangement is shown in FIG. 6 with two fans in series, with each fan being propelled by individual nozzles (not shown), and attached directly to the inside of the tower 53.

Another alternate fan arrangement is shown in FIG. 7 with four fans in parallel, and mounted in a fan shroud with four holes 56, and with each fan being propelled by individual nozzles (not shown), with the fan shroud 56 attached to the inside of the tower 53.

CONCLUSION, RAMIFICATIONS, AND SCOPE OF INVENTION

Thus the reader will see that the water atomizer of the invention provides a simple, highly efficient, cost effective device that can be used for cooling, aeration, and gas scrubbing applications.

While my above description contains many specificities, these should not be construed as limitations on the scope of the invention, but rather as an exemplification of the preferred embodiments thereof. Many other variations are possible. For example the fan assemblies may be positioned in a vertical plane around the perimiter of a tower, or instead of water being used in the system, a different fluid may be used.

Accordingly, the scope of the invention should be determined not by the embodiments illustrated, but by the appended claims and their legal equivalents.

What is claimed as invention is:

1. A water atomizer for cooling, aeration, and gas scrubbing, comprising:

(a) any number of multiple blade fans of suitable size and blade arrangement (b) support brackets with attached fan shafts (c) high velocity water nozzles of a predetermined specification attached to feed water inlet pipes (d) a conically shaped tower cap with the large open end of said conically shaped tower cap being the inlet at the bottom, and attached and covering the top of a vertical cylindrical tank or tower, with the smaller end of the tower cap having a circular exhaust opening of sufficient size to allow air or gasses to exit through said exhaust opening at the top (e) a cylindrical fan shroud of smaller diameter than said vertical tank or tower, placed concentric with the towers centerline inside the tower cap, with said cylindrical fan shroud being attached and sealed around its upper edge to the inside sloping conical walls of the tower cap (f) means for attaching said support brackets directly to the inner walls of the cylindrical fan shroud, with said fan shafts positioned vertically and with said multiple blade fans mounted on and free to rotate about the fan shafts in the horizontal plane of the tank or tower (g) means for positioning said water nozzles below the fans and pointed upward at a specific predetermined angle relative to sloping fan blades, thus permitting feed water exiting the nozzles to propel and rotate the fans by deflecting off the bottom of said sloping fan blades into the tower cap above said rotating fans, and further allowing said feed water to become atomized water droplets by falling downward from gravitational forces into the rotating fan blades and deflecting back up into the tower cap, which further permits air or gasses being propelled upward by the rotating fan to travel through said atomized water droplets.

2. The water atomizer of claim 1 wherein a plurality of fans and nozzles are arranged in different horizontal planes of the tower.

3. The water atomizer of claim 1 wherein a plurality of fans and nozzles are arranged in the same horizontal plane of the tower.

4. The water atomizer of claim 1 further including a baffle, comprised of a narrow circular deflector ring positioned concentric with and near the exhaust opening and having its outer edge attached to the inside sloping walls of the conical tower cap, and said deflector ring having attached vertical struts of predetermined length extending downward with said struts attached to the top, and supporting a circular deflector plate, with said deflector plate being slightly larger in diameter than the deflector ring opening, thus deflecting atomized water droplets downward into the spinning fan blades and preventing said atomized water droplets from exiting through the exhaust opening with the flowing air or gasses.

5. The water atomizer of claim 1 further including air inlet openings in the conical tower cap wall, with said air inlet openings located between the outer wall of the fan shroud and the inside top edge of the tower, thus permitting fresh air to be drawn in through the inlet openings and propelled through the atomized water droplets by the rotating fan, and exiting through the exhaust opening in the top of said tower cap.

* * * * *